US012611846B2

(12) United States Patent
Stray et al.

(10) Patent No.: US 12,611,846 B2
(45) Date of Patent: Apr. 28, 2026

(54) LAMINATE WINDOW WITH EDGE PROTECTION

(71) Applicant: Gentex Corporation, Zeeland, MI (US)

(72) Inventors: Joel A. Stray, Grand Haven, MI (US); Matthew A. Koppey, West Olive, MI (US); Andrew T. Mitchell, Hudsonville, MI (US); Derek J. Marshall, Jenison, MI (US); Erik Helton, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 18/793,005

(22) Filed: Aug. 2, 2024

(65) Prior Publication Data

US 2025/0042135 A1       Feb. 6, 2025

Related U.S. Application Data

(60) Provisional application No. 63/517,692, filed on Aug. 4, 2023.

(51) Int. Cl.
| | |
|---|---|
| B32B 3/10 | (2006.01) |
| B32B 17/10 | (2006.01) |
| B60J 3/04 | (2006.01) |
| G02F 1/01 | (2006.01) |

(52) U.S. Cl.
CPC .. B32B 17/10302 (2013.01); B32B 17/10036 (2013.01); B32B 17/10495 (2013.01); B60J 3/04 (2013.01); G02F 1/0107 (2013.01); B32B 2605/00 (2013.01)

(58) Field of Classification Search
None
See application file for complete search history.

(56) References Cited

U.S. PATENT DOCUMENTS

| | | | |
|---|---|---|---|
| 2003/0143371 A1 | 7/2003 | Conway et al. | |
| 2004/0218247 A1* | 11/2004 | Tonar | B32B 17/10036 |
| | | | 359/265 |
| 2007/0020442 A1 | 1/2007 | Giron et al. | |
| 2021/0071459 A1* | 3/2021 | Kleyer | B60J 1/17 |
| 2021/0103078 A1 | 4/2021 | Neuman | |

FOREIGN PATENT DOCUMENTS

| | | | |
|---|---|---|---|
| KR | 980007245 U | 4/1998 | |

* cited by examiner

*Primary Examiner* — Christopher M Polley
(74) *Attorney, Agent, or Firm* — Price Heneveld LLP; Brian James Brewer

(57) ABSTRACT

A vehicle window assembly includes first and second substrates substantially transparent to visible light and a seal with internal and external portions. The second substrate is disposed in a spaced apart relationship relative to the first substrate and defines a space therebetween. The internal portion is disposed in the space between the first and second substrates along at least part of peripheries thereof. The external portion is disposed external relative to space between the first and second substrates, has a substantially flexible construction, and substantially extends outward from the first and second substrates. The seal substantially inhibits at least one of water and oxygen from entering the space. A coupling agent is disposed between the first and second substrates, laminates the substrates together, and adheres the seal thereto. When disposed in a window opening, the external portion of the seal deflects against an edge of the opening.

18 Claims, 8 Drawing Sheets

LAMINATE WINDOW WITH EDGE PROTECTION

CROSS-REFERENCE TO RELATED APPLICATION

This application claims priority to and the benefit under 35 U.S.C. § 119(e) of U.S. Provisional Application No. 63/517,692, filed on Aug. 4, 2023, entitled "LAMINATE WINDOW WITH EDGE PROTECTION," the disclosure of which is hereby incorporated herein by reference in its entirety.

FIELD OF THE DISCLOSURE

The present disclosure relates, in general, to windows with edge protection and, more particularly, to laminate windows with edge protection.

SUMMARY OF THE DISCLOSURE

According to one aspect of the present disclosure, a vehicle window assembly includes a first substrate substantially transparent to visible light and a second substrate substantially transparent to visible light. The second substrate is disposed in a spaced apart relationship relative to the first substrate and defines a space therebetween. The vehicle window assembly also includes a seal that has an internal portion and an external portion. The internal portion is disposed in the space between the first and second substrates along at least part of peripheries thereof. The external portion is disposed external relative to space between the first and second substrates. The external portion has a substantially flexible construction and substantially extends outward from the first and second substrates. The seal substantially inhibits at least one of water and oxygen exterior the space from entering the space. A coupling agent is disposed between the first and second substrates, laminates the first and second substrates together, and adheres the seal thereto. When the vehicle window assembly is disposed in a window opening, the external portion of the seal deflects against an edge of the opening.

According to another aspect of the present disclosure, an optic system for a vehicle includes a window opening that is defined by the vehicle, at least in part, by an edge thereof. A laminate window is disposed in the opening and includes a first substrate substantially transparent to visible light and a second substrate substantially transparent to visible light. The second substrate is disposed in a spaced apart relationship relative to the first substrate, and defines a space therebetween. The laminate window also includes a seal that has an internal portion and an external portion. The internal portion is disposed in the space between the first and second substrates along at least part of peripheries thereof. The external portion is disposed external relative to space between the first and second substrates. The external portion has a substantially flexible construction and substantially extends outward from the first and second substrates. The seal substantially inhibits at least one of water and oxygen exterior the space from entering the space. A coupling agent is disposed between the first and second substrates. The coupling agent laminates the first and second substrates together and adheres the seal thereto. An external portion of the seal deflects against the edge of the opening in a direction of the first substrate.

According to still another aspect of the present disclosure, a vehicle window includes a first substrate substantially transparent to visible light and a second substrate disposed adjacent to the first substrate. A seal that has an internal portion is disposed between the first and second substrates. The seal also has an external portion that is disposed external to the first and second substrates. The external portion has a substantially flexible construction and substantially extends outward from the first and second substrates. A coupling agent is disposed between the first and second substrates. The coupling agent laminates the first and second substrates together. The external portion of the seal deflects against an edge of an opening in a direction of the first substrate.

These and other features, advantages, and objects of the present disclosure will be further understood and appreciated by those skilled in the art by reference to the following specification, claims, and appended drawings.

DETAILED DESCRIPTION

Figure 1:
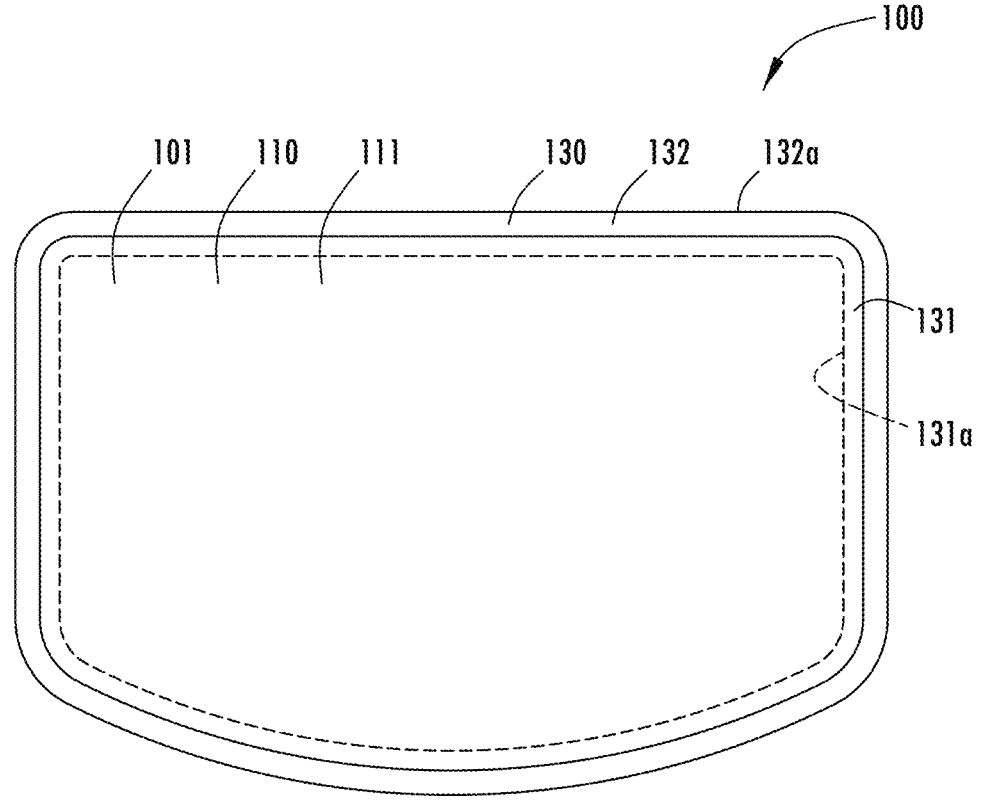
FIG. 1 is a front perspective view of a window of the present disclosure, taken from an exterior direction.

The present illustrated embodiments reside primarily in combinations of method steps and apparatus components related to laminate windows with edge protection. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to a surface of the device closest to an intended viewer, and the term "rear" shall refer to a surface of the device furthest from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

For the purposes of description herein, the specific devices and processes illustrated in the attached drawings and described in this disclosure are simply exemplary embodiments of the inventive concepts defined in the appended claims. Hence, specific characteristics relating the embodiments disclosed herein are not limiting, unless the claims expressly state otherwise.

Laminate construction vehicular windows are becoming increasingly common. Such a construction typically utilizes two or more substrates laminated together with an adhesive. However, such a construction may be problematic, because the cured adhesive materials are typically a poor water barrier and act as a sieve, allowing water and/or oxygen molecules to get between the substrates. This is an issue, because the water seeping in may be detrimental to the lamination integrity itself. Additionally, films and/or devices disposed within the lamination stack may be exposed to the water and/or oxygen. These films and/or devices may be particularly sensitive to water and/or oxygen and degrade. This is the case for electro-optic elements, which are increasingly desired to be inserted within vehicular windows. Furthermore, these constructions may also be problematic, because during assembly, the window may experience a bulging in the middle and/or tapering of the substrates at the ends, reducing the flatness of the devices.

The present disclosure is directed to a window 100, various aspects of which are illustrated in FIGS. 1-13. Window 100 may be for a vehicle 10. Accordingly, window 100 may be configured to be and/or may be disposed in an opening 11 of the vehicle. Opening 11 may be defined by an edge 12. Further, window 100 has a first substrate 110, a second substrate 120, a seal 130, and/or a coupling agent 140. Accordingly, window 100 may have a laminate construction. Further, window 100 has an exterior facing surface 101 and an interior facing surface 102, relative to an interior of vehicle 10.

First substrate 110 may be substantially transparent in the visible region of the electromagnetic spectrum. Further, first substrate 110 may have a first surface 111 and a second surface 112. First surface 111 and second surface 112 may be disposed on opposite sides of first substrate 110. Additionally, first substrate 110 may also have an edge 113 extending between the first and second surfaces 111, 112. In some embodiments, first surface 111 may be disposed or configured for disposal in an exterior direction relative to the vehicle interior. Accordingly, first surface 111 may be the exterior facing surface 101. Additionally, first substrate 110, for example, may be fabricated from any of a number of materials, such as alumino-silicate glass, such as Falcon commercially available from AGC; boroaluminosilicate ("BAS") glass; polycarbonate, such as ProLens® polycarbonate, commercially available from Professional Plastics, which may be hard coated; polyethylene terephthalate, such as but not limited to Spallshield® CPET available from Kuraray®; soda lime glass, such as ultra-clear soda lime glass; float glass; natural and synthetic polymeric resins and plastics, such as polyethylene (e.g., low and/or high density), polyethylene terephthalate (PET), polyethylene naphthalate (PEN), polycarbonate (PC), polysulfone, acrylic polymers (e.g., poly(methyl methacrylate) (PMMA)), polymethacrylates, polyimides, polyamides (e.g., a cycloaliphatic diamine dodecanedioic acid polymer (i.e., Trogamid® CX7323)), epoxies, cyclic olefin polymers (COP) (e.g., Zeonor 1420R), cyclic olefin copolymers (COC) (e.g., Topas 6013S-04 or Mitsui Apel), polymethylpentene, cellulose ester based plastics (e.g., cellulose triacetate), transparent fluoropolymer, polyacrylonitrile; and/or combinations thereof. While particular substrate materials are disclosed, for illustrative purposes only, numerous other substrate materials are likewise suitable—so long as the materials are at least substantially transparent and exhibit appropriate physical properties such as strength and tolerance to conditions of the device's environment.

Similarly, second substrate 120 may be substantially transparent in the visible region of the electromagnetic spectrum. Further, second substrate 120 may have a third surface 123 and a fourth surface 124. Third surface 123 and fourth surface 124 may be disposed on opposite sides of second substrate 120. As such, second substrate 120 may also have an edge 125 extending between the third and fourth surfaces 123, 124. Additionally, second substrate 120 may be disposed in a substantially parallel and/or spaced apart relationship relative first substrate 110. Accordingly, a space 150 may be defined between the first and second substrates 110, 120. Further, third surface 123 may face second surface 112. In some embodiments, fourth surface 124 may be interior facing surface 102. Further, second substrate 120 may be comprised of the same or similar materials suitable for first substrate 110.

Seal 130 may have an internal portion 131 and an external portion 132. Further, seal 130 may substantially inhibit water and/or oxygen exterior space 150 from entering space 150. As such, seal 130 may provide a seal to space 150. Accordingly, seal 130 may comprise a rubber construction. Additionally, seal 130 may be disposed about an substantial entirety of a periphery of window 100. In some embodiments, seal 130 may be formed as an extruded rubber profile fit to the first and/or second substrates 110, 120.

Internal portion 131 may be disposed in space 150 between the first and second substrates 110, 120. As such, internal portion 131 may be defined as the portion of seal 130 disposed in space 150 between the first and second substrates 110, 120. Further, internal portion 131 may further be disposed along peripheral portions of the first and second substrates 110, 120 and extend only part way into space 150 between the first and second substrates 110, 120. Accordingly, internal portion 131 may extend inward into space 150 and terminate at an inboard perimeter defined, at least in part, by an inboard edge 131a. Additionally, internal portion 131 may follow edge 113 and/or edge 125 about a substantial entirety thereof. As such, internal portion 131 may provide for a seal of space 150 between the first and/or second substrates 110, 120. This is very beneficial as oxygen and/or water may serve to deteriorate the lamination of the first and/or second substrates 110, 120 or elements disposed therebetween.

Figure 4:
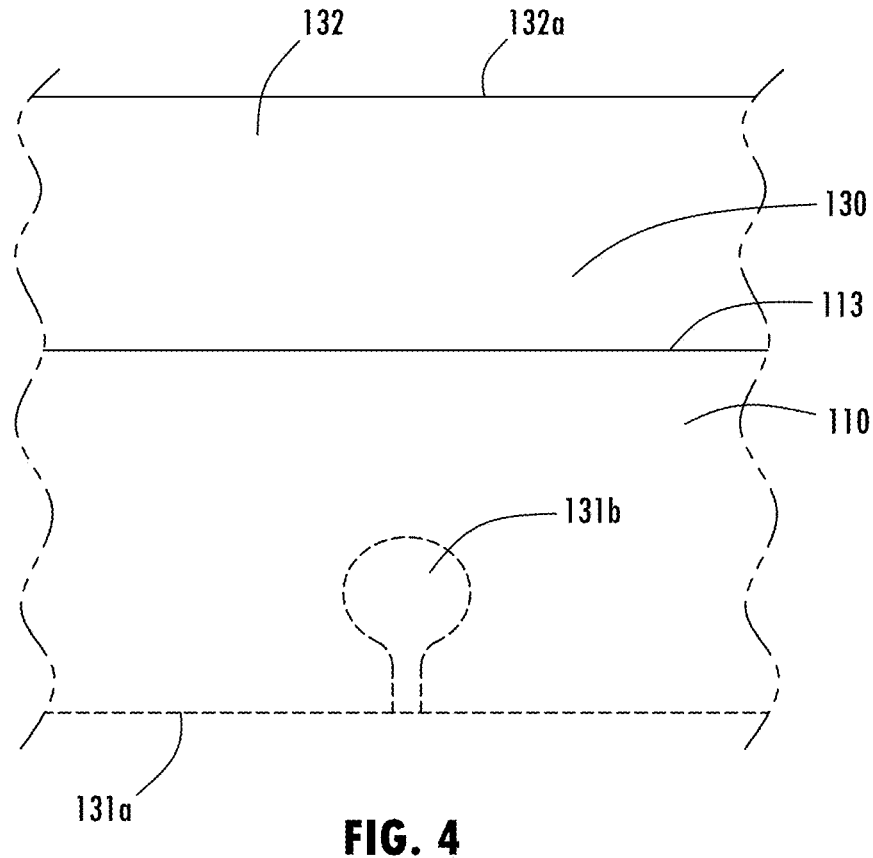
FIG. 4 is an enlarged front perspective view of a window of the present disclosure, taken from an exterior direction, illustrating a seal of the window with a mechanical interlock.

In some embodiments, as shown in FIG. 4, internal portion 131 may have one or more mechanical interlock 131b. A mechanical interlock 131b may be a void in internal portion 131 providing for a space to be filled by coupling agent 140. The void may form a larger cavity portion and may extend to inboard edge 131a in a narrower portion than at the relatively larger cavity. As such, mechanical interlock 131b may increase the strength of the seal's 130 adhesion with the first and/or second substrates 110, 120. Additionally, the larger cavity portion of the void may substantially embody a variety of shapes, such as, a circle, a triangle, a square, a hexagon, etc.

Figure 2:
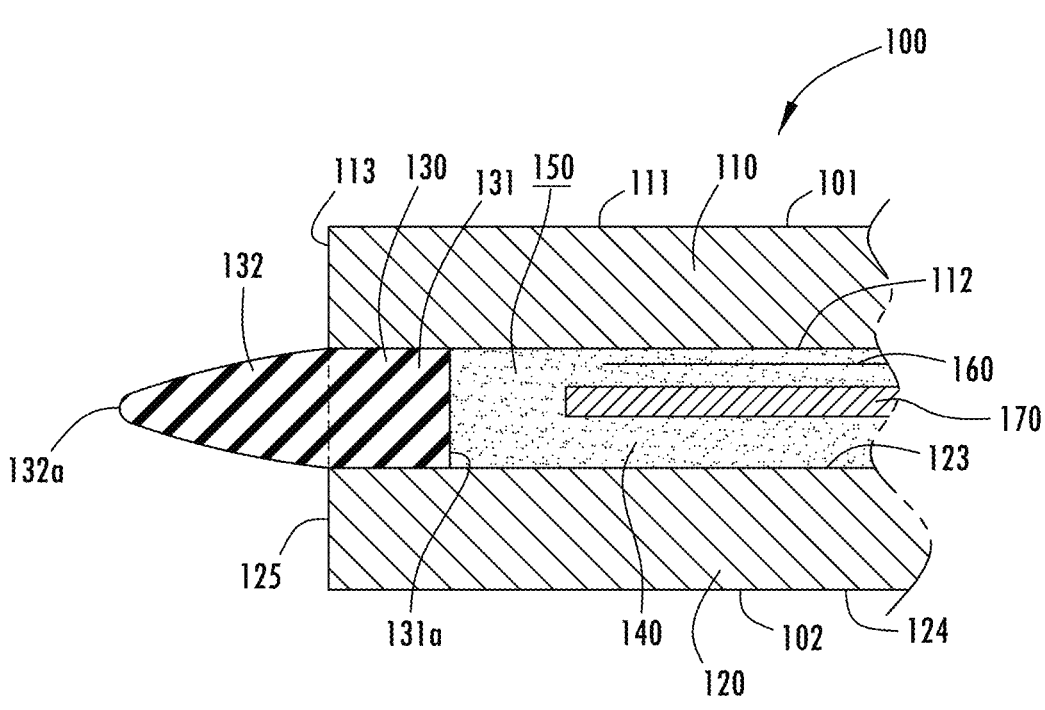
FIG. 2 is a cross-sectional view of a window of the present disclosure.
Figure 3:
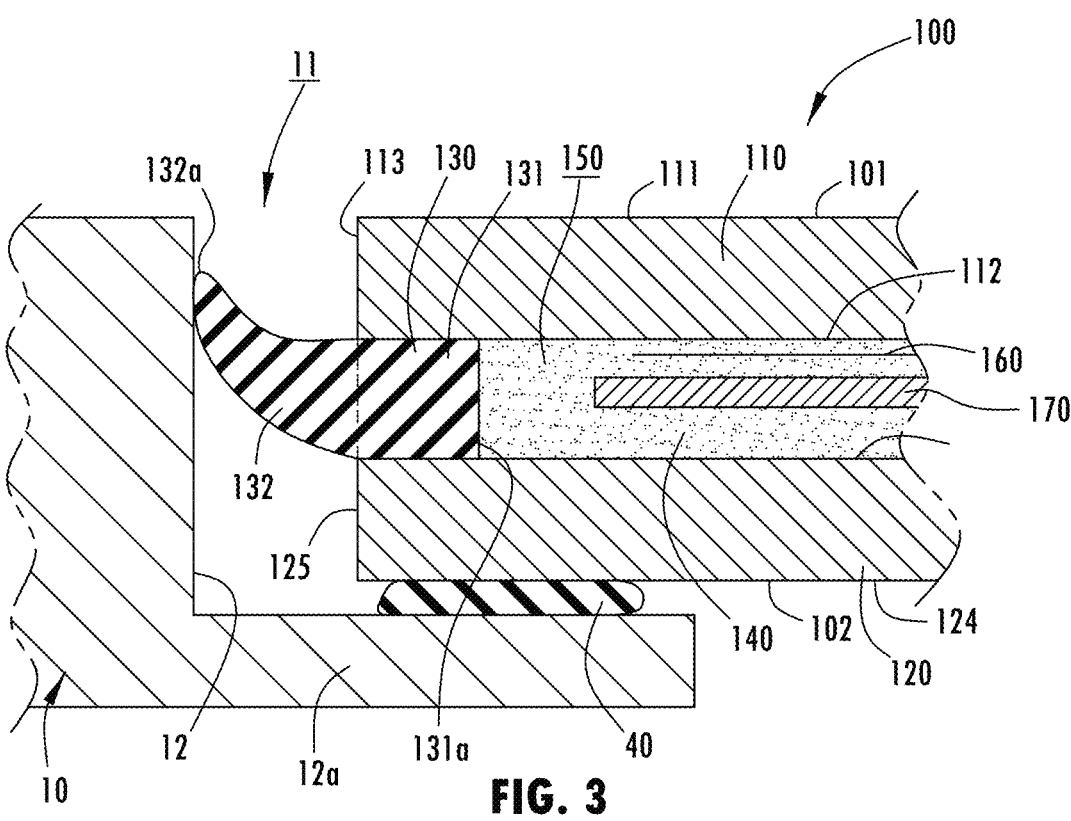
FIG. 3 is a cross-sectional view of the window of FIG. 2, illustrated within a vehicle.

Conversely, external portion 132 may be defined as the portion of seal 130 disposed exterior relative to space 150. Further, external portion 132 may substantially extend away from the first and/or second substrates 110, 120. In some embodiments, this extension may be directly away from the first and/or second substrates 110, 120, as shown in FIGS. 2, 5, 7, and 9. The extension of external portion 132 may terminate at a tip 132a thereof. As such, tip 132a may be a part of external portion 132 furthest away from the first and/or second substrates 110, 120. In some embodiments, such as shown in FIG. 2, external portion 132 may form a single relatively featureless protrusion. Additionally, external portion 132 may have a substantially flexible construction. Accordingly, as shown in FIGS. 3, 6, 8, and 10, when window 100 is disposed within opening 11, external portion 132 may deflect against edge 12 of opening 11. The deflection may be in an upward direction toward first substrate 110 such that tip 132a of external portion 132 is deflected to an exterior of the vehicle. External portion 132 may serve to substantially reduce debris and water from getting between edge 12 and window 100. This may provide for a more aesthetically pleasing appearance. Additionally, external portion 132 may serve to prevent direct contact between first substrate 110 and edge 12, which could lead to failure of first substrate 110, necessitating replacement of the entire window 100. Furthermore, in this position, seal 130 may provide for enhanced aesthetics by hiding second substrate 120 in stances where edge 125 may stand proud of edge 113, which would otherwise be visible when viewed from above. This enables the use of looser tolerances, reducing manufacturing costs, and/or eliminates a necessity to use a second substrate 120 relatively smaller than first substrate 110.

Figure 5:
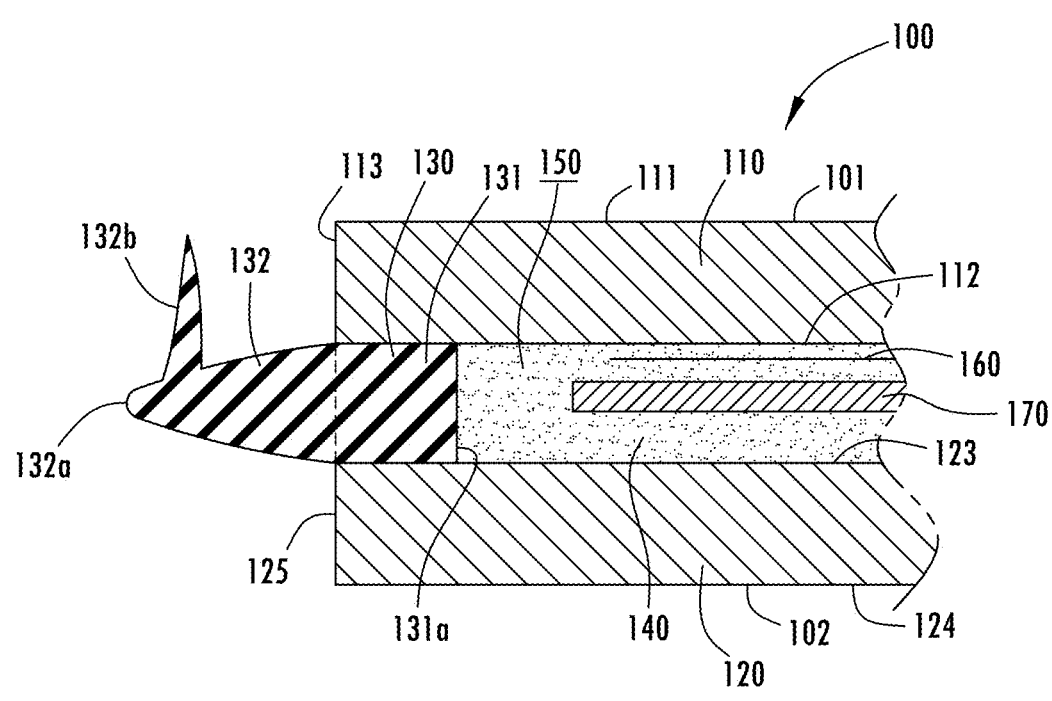
FIG. 5 is a cross-sectional view of a window of the present disclosure including a seal with a first appendage.
Figure 6:
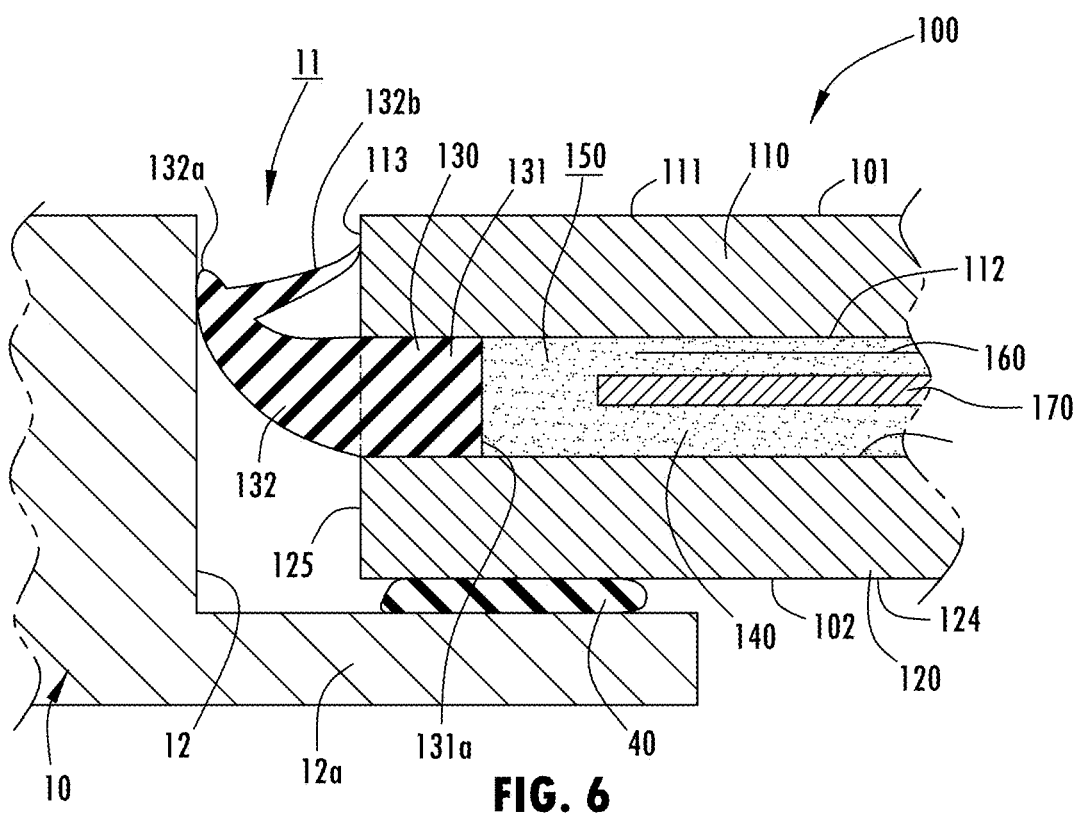
FIG. 6 is a cross-sectional view of the window of FIG. 5, illustrated within a vehicle.

In some embodiments, external portion 132 may have one or more appendage extending therefrom. The appendages may include a first appendage 132b, as shown in FIGS. 5 and 6; a second appendage 132c, as shown in FIGS. 7-10; and/or a third appendage 132d, as shown in FIGS. 7-10.

First appendage 132b may extend substantially orthogonal to a main body of external portion 132. Further, as shown in FIG. 5, first appendage 132b may extend in a substantially exterior direction from the main body of external portion 132 relative to the interior of vehicle 10, when window 100 is not installed in vehicle 10. Additionally, first appendage 132b may go along a substantial entirety of seal 130 about the perimeter of window 100 such that it substantially circumscribes the first and/or second substrates 110, 120. As such, first appendage 132b may form a ridge along the main body of external portion 132. When window 100 is disposed within opening 11 and external portion 132 is deflected, as shown in FIG. 6, first appendage 132b may contact edge 113 of first substrate. Such an embodiment may have the advantage of further reducing the ability of debris and water from getting between edge 12 and window 100.

Second appendage 132c may extend substantially orthogonal to the main body of external portion 132 directly along and abutting edge 113 of first substrate 110. Further, second appendage 132c may terminate at or substantially proximate to exterior facing surface 101. As such, second appendage 132c may extend in a substantially exterior direction from the main body of external portion 132 relative to the interior of vehicle 10. Additionally, second appendage 132c may be along edge 113 along a substantial entirety thereof such that it substantially circumscribes first substrate 110. Such an embodiment may have the advantage of providing protection to edge 113, which may be otherwise vulnerable to chipping, which could cause failure of first substrate 110, necessitating replacement of the entire window 100.

Similarly, third appendage 132d may extend substantially orthogonal to the main body of external portion 132 directly along and abutting edge 125 of second substrate 120. As such, third appendage 132d may extend in a substantially interior direction from the main body of external portion 132 relative to the interior of vehicle 10. Additionally, third appendage 132d may be along edge 125 along a substantial entirety thereof such that it substantially circumscribes second substrate 120. Such an embodiment may have the advantage of providing protection to edge 125, which may be otherwise vulnerable to chipping, which could cause failure of second substrate 120, necessitating replacement of the entire window 100.

Figure 7:
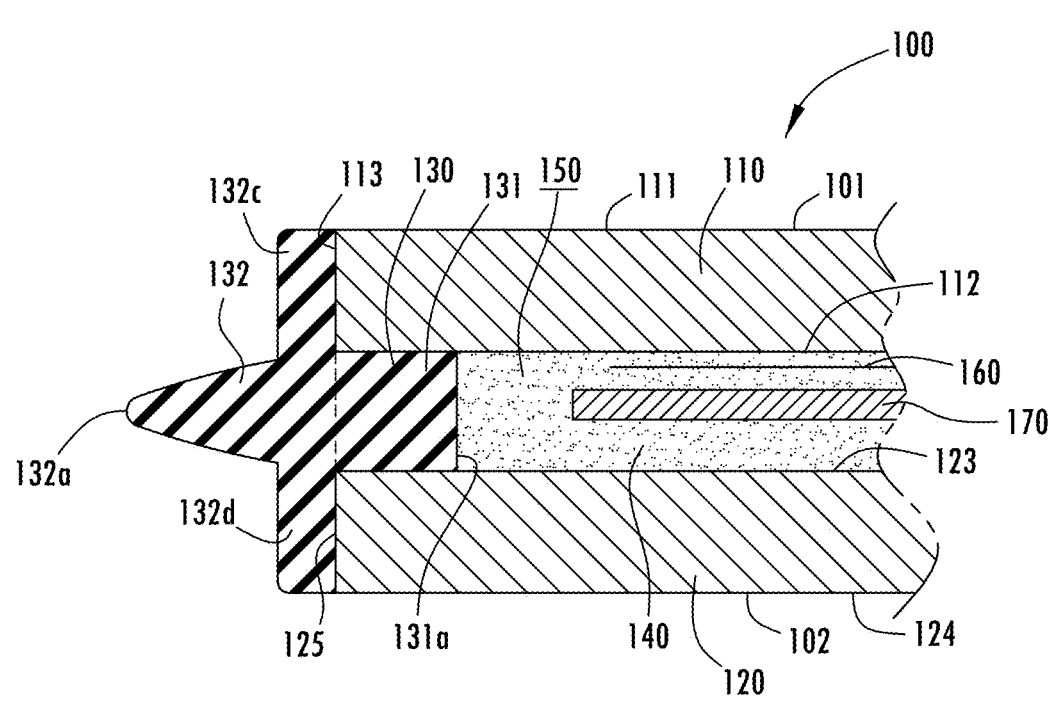
FIG. 7 is a cross-sectional view of a window of the present disclosure including a seal with a second appendage and a third appendage.
Figure 8:
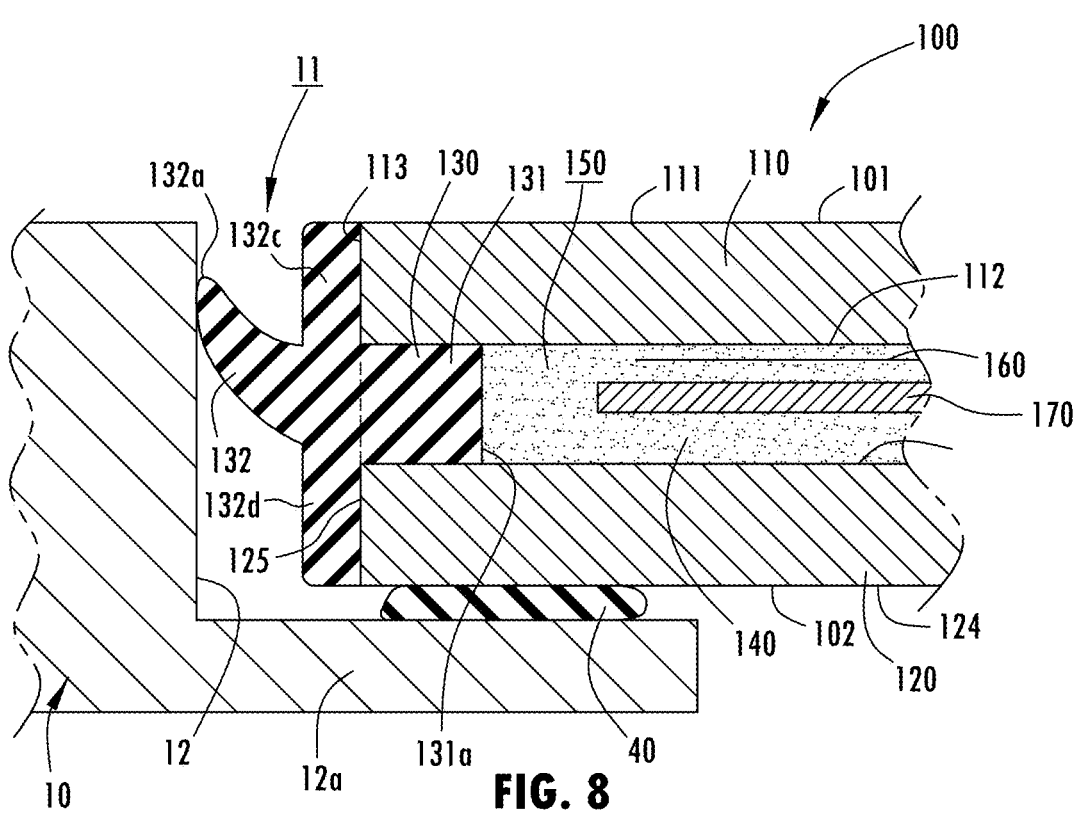
FIG. 8 is a cross-sectional view of the window of FIG. 7, illustrated within a vehicle.
Figure 9:
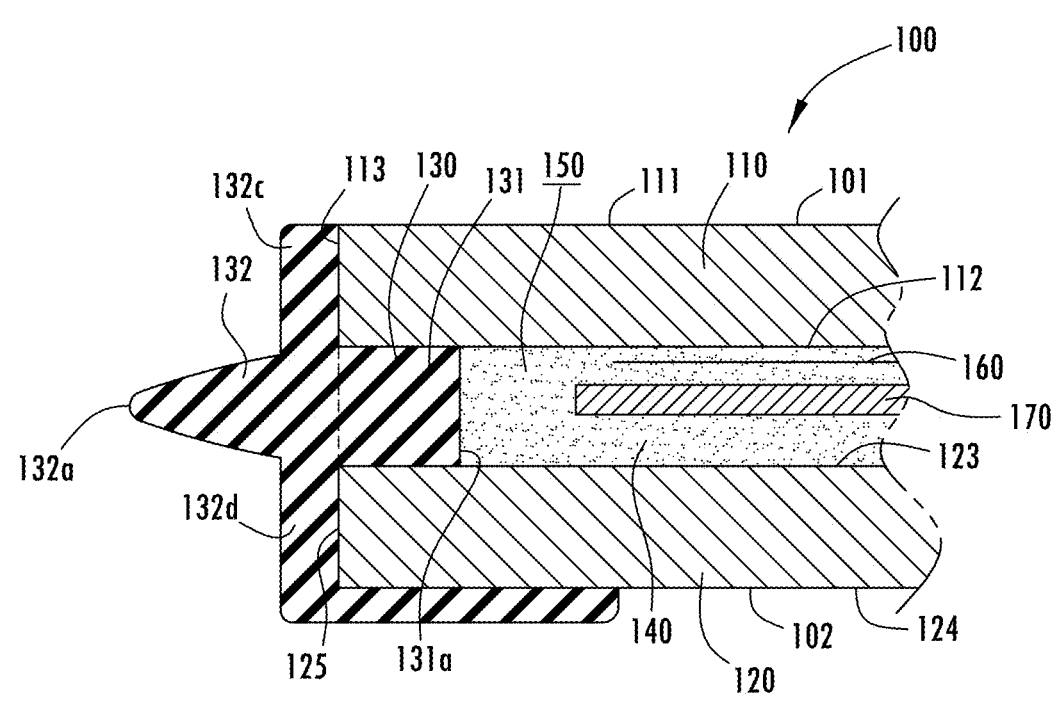
FIG. 9 is a cross-sectional view of a window of the present disclosure including a seal with a second appendage and a third appendage that wraps around to an interior surface of the window.
Figure 10:
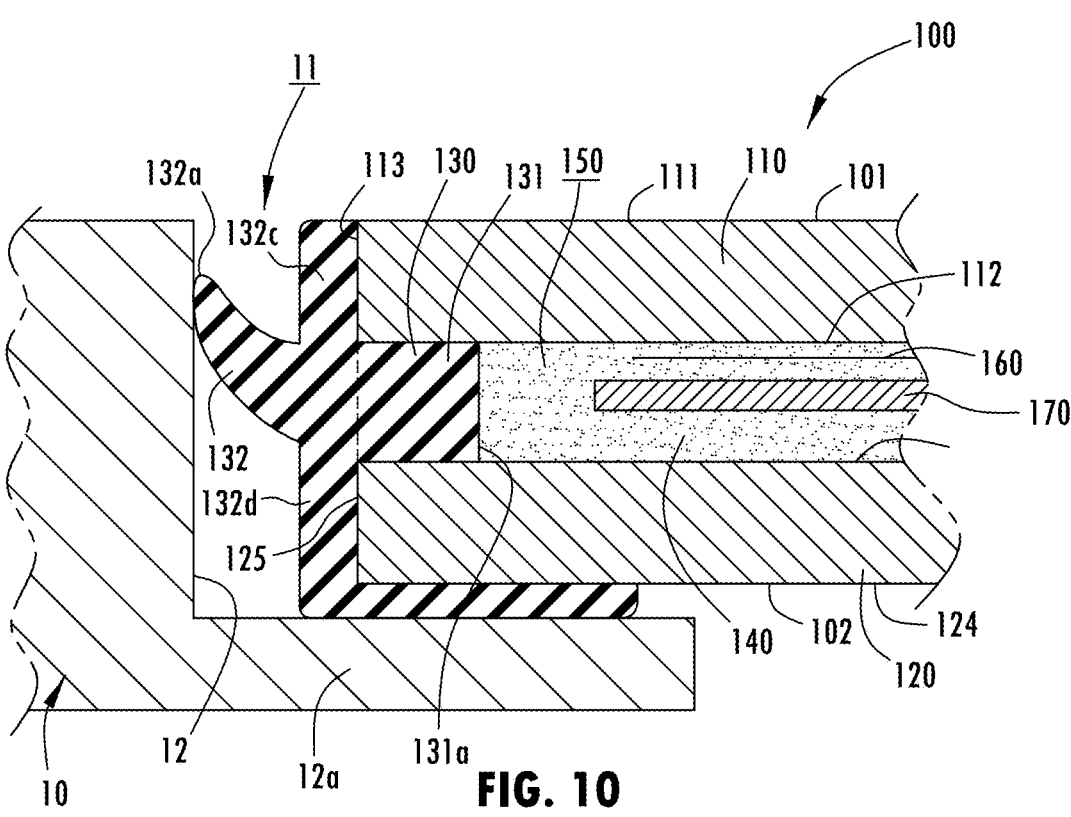
FIG. 10 is a cross-sectional view of the window of FIG. 9, illustrated within a vehicle.

In some embodiments, as shown in FIGS. 7 and 8 third appendage 132d may terminate at or substantially proximate to interior facing surface 102. Alternatively, in other embodiments, as shown in FIGS. 9 and 10, third appendage 132d may further wrap around edge 125 such that it extends onto fourth surface 124. Further, when window 100 is disposed within opening 11, as shown in FIG. 10, window 100 may be disposed on a lip 12a of edge 12. Accordingly, third appendage 132d may provide for a bumper between window 100 and second substrate 120, protecting second substrate 120 from damage, and may provide for a seal between window 100 and edge 12. Such a construction may eliminate the need for a gasket 40 between interior facing surface 102 and lip 12a.

Coupling agent 140 may be disposed and/or cured within space 150 to adhere two or more of: first substrate 110, second substrate 120, and seal 130, together. Accordingly, coupling agent 140 may serve to laminate the first and/or second substrates 110, 120 together and/or adhere seal 130 thereto. Further, in some embodiments, coupling agent 140 may be further disposed within the void of the one or more mechanical interlocks 131b. Furthermore, coupling agent 140 may be substantially optically clear when cured. As such, coupling agent 140 may be a polymer and/or adhesive. For example, coupling agent 140 may be comprised of polyvinyl butyral ("PVB"), ethylene vinyl acetate ("EVA"); polyvinyl butyral ("PVB"); thermoplastic urethane ("TPU"); substantially transparent epoxy, such as OE1582 commercially available from United Adhesives, Inc.; acrylic, such as but not limited to Acrylic 8146-2 Optically Clear Adhesive from 3M®, which may be a film, adhesive, or Acrylic Liquid 1088 Liquid Optical Coupling Adhesive from 3M®; or silicone.

Figure 11:
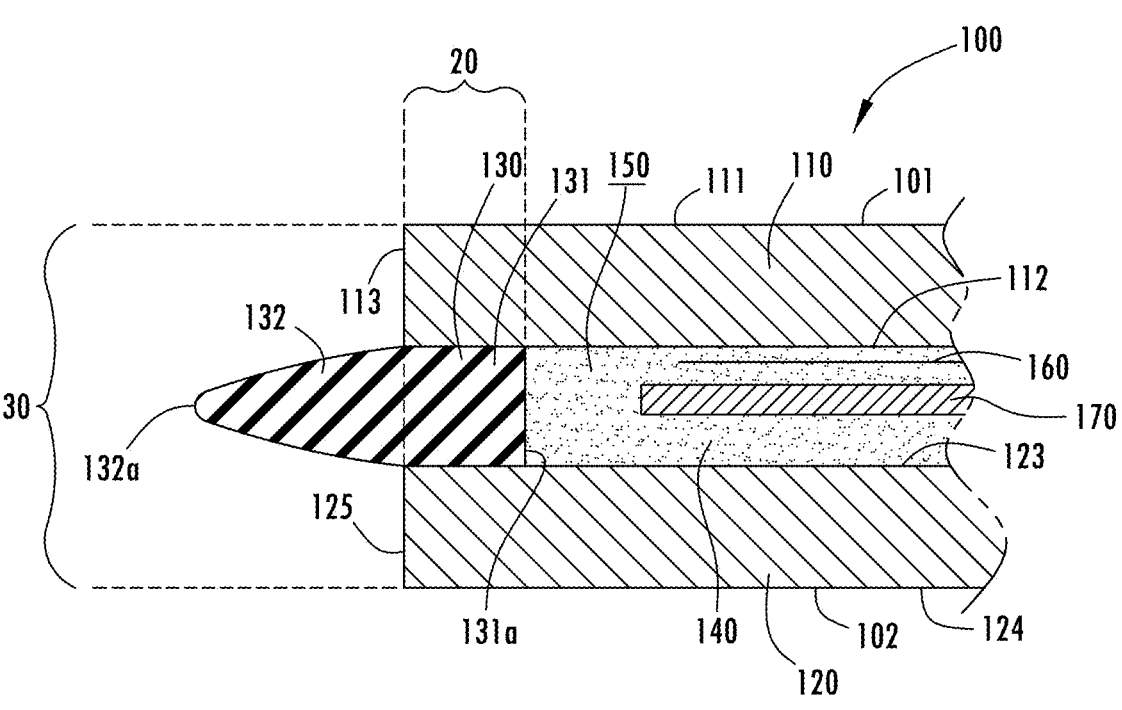
FIG. 11 is a cross-sectional view illustrating a flatness of a window with a seal of the present disclosure.
Figure 12:
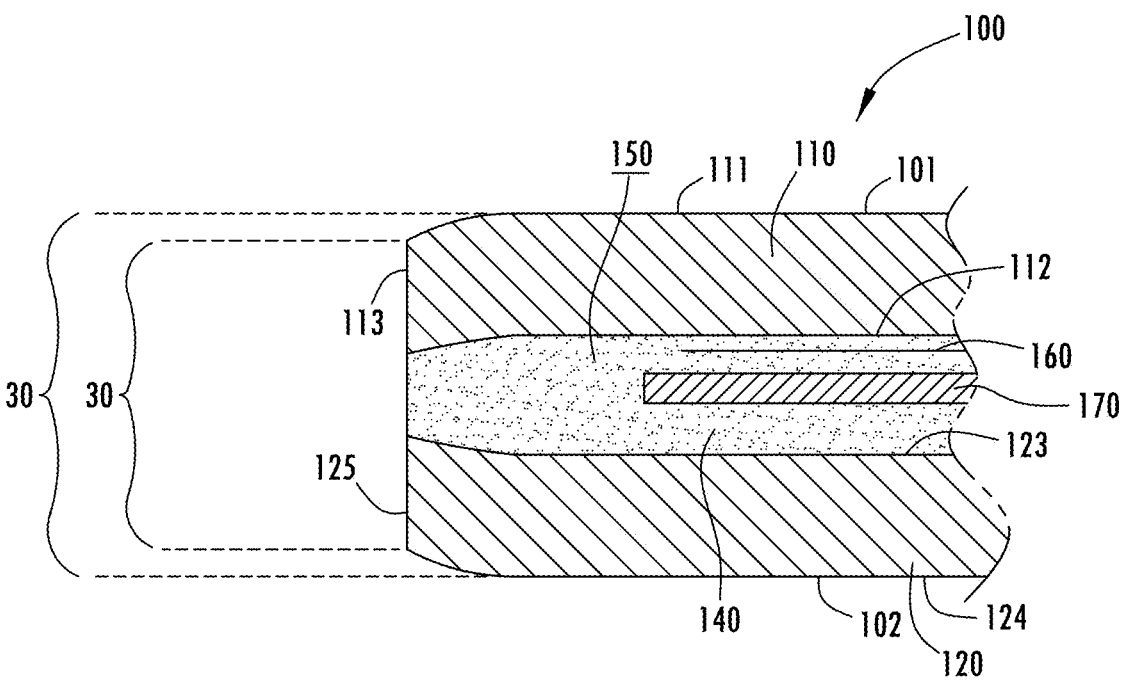
FIG. 12 is a cross-sectional view illustrating a non-flatness of a window without a seal of the present disclosure.

Seal 130, as shown in FIG. 11, may additionally have the advantage of substantially enhancing flatness of window 100, particularly about a periphery 20 thereof. Accordingly, a thickness 30 of window 100 about periphery 20 thereof may have a variance of less than 5.0, 4.0, 3.0, 2.0, or 1.0%. Periphery 20 with enhanced flatness may be defined as extending from the outer perimeter of window 100 at edge 113 and/or edge 125, inward to the internal portion 131. This is substantially superior to constructions lacking seal 130, as manufacture of window 100 may otherwise result in the first and second substrates 110, 120 pinching at the ends and/or bulging at their interiors, as shown in FIG. 12. Such constructions exhibit thickness variances between 10 and 15%. Accordingly, in constructions having a thickness of about 2.0 mm, that is a variance in thickness of 0.2-0.3 mm, which is substantial.

In some embodiments, window 100 may further comprise one or more films 160 laminated between the first and second substrates 110, 120. The one or more films 160 may serve to enhance or add functionality of widow 100. A film 160, for example, may be a solar film. In some such embodiments, a film 160 may be directly abut second surface 112.

Figure 13:
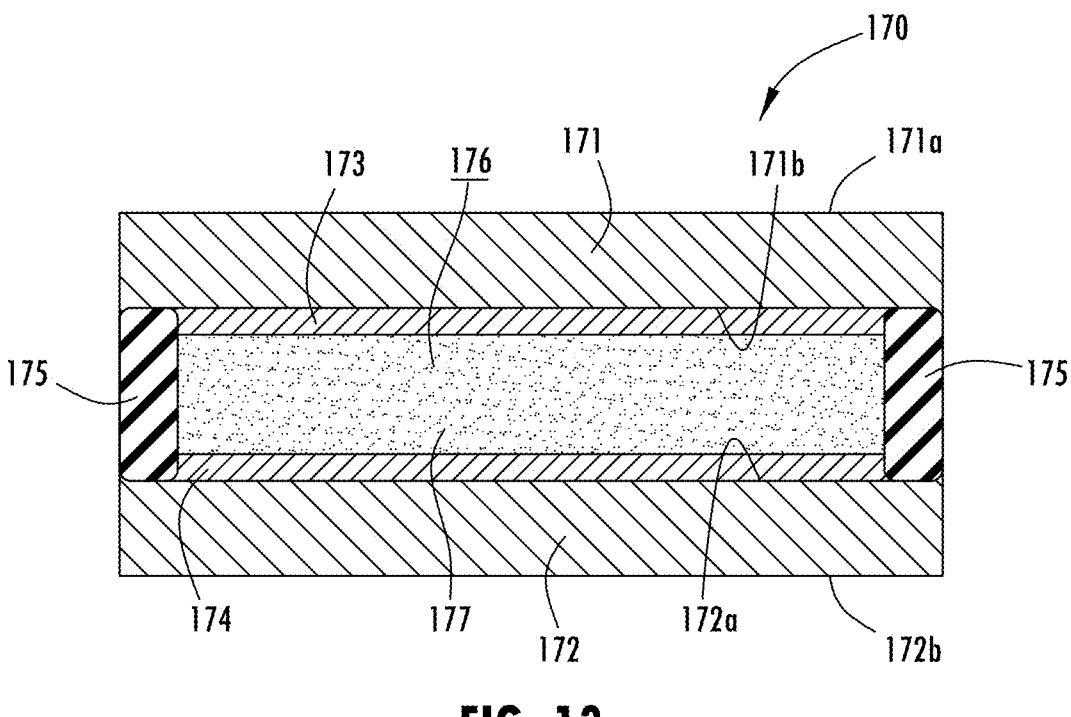
FIG. 13 is a cross-sectional view of an electro-optic element of the present disclosure.

In some embodiments, window 100 may further comprise an electro-optic element 170. Electro-optic element 170, as shown in FIG. 13, may comprise a first electro-optic element substrate 171, a second electro-optic element substrate 172, a first electrode 173, a second electrode 174, a electro-optic element seal 175, a chamber 176, and/or an electro-optic medium 177. Further, electro-optic element 170 may be switchable between a substantially activated state and a substantially un-activated state. Accordingly, electro-optic element 170 may be variably transmissive.

First electro-optic element substrate 171 comprises a first surface 171a and a second surface 171b on opposite sides thereof. Second surface 171b may be in an interior direction relative first surface 171a. Further, first electro-optic element substrate 171, may be fabricated from any of a number of materials that are transparent or substantially transparent in the visible region of the electromagnetic spectrum, such as borosilicate glass, soda lime glass, float glass, natural and synthetic polymeric resins, plastics, and/or composites. Substrate materials may be selected from any number of materials so long as the materials are substantially transparent and exhibit appropriate physical properties such as strength and tolerance to conditions of its environment, such as ultra-violet light exposure from the sun and temperature extremes.

Second electro-optic element substrate 172 is disposed in a substantially parallel, spaced apart relationship relative first electro-optic element substrate 171. Further, second electro-optic element substrate 172 comprises a third surface 172a and a fourth surface 172b on opposite sides thereof. Fourth surface 172b may be disposed in the interior direction relative third surface 172a. Additionally, second electro-optic element substrate 172 may be fabricated from the same or similar materials as that of first electro-optic element substrate 171.

First electrode 173 is an electrically conductive material associated with second surface 171b. The electrically conductive material of first electrode 173 may be substantially transparent in the visible region of the electromagnetic spectrum and generally resistant to corrosion from materials contained within the electro-optic element. The electrically conductive material may be a transparent conductive oxide (TCO), such as fluorine doped tin oxide (FTO), indium-doped oxide, doped zinc oxide, or other materials known in the art.

Similarly, second electrode 174 is an is an electrically conductive material associated with third surface 172a. Second electrode 174 may likewise be substantially transparent. Accordingly, the electrically conductive material of second electrode 174 may be fabricated from the same or similar materials as that of first electrode 173.

Electro-optic element seal 175 may be disposed in a peripheral manner to define chamber 176 between first electro-optic element substrate 171 and second electro-optic element substrate 172. Chamber 176 may be defined by electro-optic element seal 175 in conjunction with at least two of: first electro-optic element substrate 171, second electro-optic element substrate 172, first electrode 173, and second electrode 174. In some embodiments, chamber 176 may, more specifically, be defined by electro-optic element seal 175, first electrode 173, and second electrode 174. Accordingly, chamber 176 may be between the first and second electro-optic element electrodes 171, 172. An electro-optic element seal may comprise any material capable of being adhesively bonded to the at least two of: first electro-optic element substrate 171, second electro-optic element substrate 172, first electrode 173, and second electrode 174, to in turn seal chamber 176 such that electro-optic medium 177 does not inadvertently leak out and/or such that electro-optic medium 177 is protected from exposure to water or oxygen.

Electro-optic medium 177 is disposed between the first and second electrodes 173, 174. Thus, electro-optic medium 177 may be disposed in chamber 176. Additionally, electro-optic medium 177 is electro-active. Therefore, electro-optic medium 177 is operable between activated and un-activated states in response to an electrical potential. Accordingly, electro-optic medium 177 may include, among other materials, electro-active anodic and cathodic materials. In some embodiments, the anodic and/or cathodic materials may be electrochromic. In other words, the electro-optic medium 177 may be electrochromic. Electrochromic means that upon activation, due to the application of an electronic voltage or potential, the electrochromic item may exhibit a change in absorbance at one or more wavelengths of the electromagnetic spectrum. Accordingly, the electro-optic medium 177 may be variably transmissive. The change in absorbance may be in the visible, ultra-violet, infra-red, and/or near infra-red regions. In other embodiments, electro-optic medium 177 may be a liquid crystal medium or a suspended particle medium. Electro-optic medium 177 may be fabricated from any one of a number of materials, including, for example, those disclosed in U.S. Pat. No. 6,433,914, entitled "Color-Stabilized Electrochromic Devices," which is herein incorporated by reference in its entirety.

In this document, relational terms, such as "first," "second," and the like, are used solely to distinguish one entity or action from another entity or action, without necessarily requiring or implying any actual such relationship or order between such entities or actions.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; B and C in combination; or A, B, and C in combination.

For purposes of this disclosure, the term "associated" generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within 10% of each other, such as within 5% of each other, or within 2% of each other.

The term "transparent" is applied in the relative sense. "Transparent" refers to an optical element or material that is substantially transmissive of at wavelengths in question and thus generally allows light at such wavelengths to pass therethrough. The wavelengths in question will vary based on the context. However, in the event the wavelengths in question is not readily apparent, the wavelengths in question shall generally refer to visible light.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

It will be understood by one having ordinary skill in the art that construction of the described disclosure and other components is not limited to any specific material. Other exemplary embodiments of the disclosure disclosed herein may be formed from a wide variety of materials, unless described otherwise herein.

According to one aspect of the present disclosure, a vehicle window assembly includes a first substrate substantially transparent to visible light and a second substrate substantially transparent to visible light. The second substrate is disposed in a spaced apart relationship relative to the first substrate and defines a space therebetween. The vehicle window assembly also includes a seal that has an internal portion and an external portion. The internal portion is disposed in the space between the first and second substrates along at least part of peripheries thereof. The external portion is disposed external relative to space between the first and second substrates. The external portion has a substantially flexible construction and substantially extends outward from the first and second substrates. The seal substantially inhibits at least one of water and oxygen exterior the space from entering the space. A coupling agent is disposed between the first and second substrates, laminates the first and second substrates together, and adheres the seal thereto. When the vehicle window assembly is disposed in a window opening, the external portion of the seal deflects against an edge of the opening.

According to another aspect of the present disclosure, a vehicle window assembly includes a solar film disposed between first and second substrates.

According to another aspect of the present disclosure, a vehicle window assembly includes a variably transmissive electro-optic element disposed between first and second substrates.

According to another aspect of the present disclosure, an external portion of a seal has an appendage that extends therefrom. The appendage substantially circumscribes a first substrate.

According to another aspect of the present disclosure, a seal deflects against an edge of an opening, and a tip of an appendage contacts an edge of a first substrate.

According to still another aspect of the present disclosure, an appendage is a ridge that extends from an external portion of a seal.

According to another aspect of the present disclosure, an external portion has at least one appendage that substantially covers and abuts an edge of one of a first substrate and an edge of a second substrate.

According to yet another aspect of the present disclosure, at least one appendage wraps around an edge of a respective substrate and extends onto an outer surface thereof.

According to another aspect of the present disclosure, a thickness of a window assembly from edges of first and second substrates to an internal edge of a seal has a variance of less than 5%. The thickness is measured as a distance between outer surfaces of the first and second substrates.

According to still another aspect of the present disclosure, a vehicle window assembly includes an electrically conductive connector that is connected to an electro-optic element and extends to a terminus exterior a space. The connector extends between a seal and one of first and second substrates.

According to another aspect of the present disclosure, an optic system for a vehicle includes a window opening that is defined by the vehicle, at least in part, by an edge thereof. A laminate window is disposed in the opening and includes a first substrate substantially transparent to visible light and a second substrate substantially transparent to visible light. The second substrate is disposed in a spaced apart relationship relative to the first substrate, and defines a space therebetween. The laminate window also includes a seal that has an internal portion and an external portion. The internal portion is disposed in the space between the first and second substrates along at least part of peripheries thereof. The external portion is disposed external relative to space between the first and second substrates. The external portion has a substantially flexible construction and substantially extends outward from the first and second substrates. The seal substantially inhibits at least one of water and oxygen exterior the space from entering the space. A coupling agent is disposed between the first and second substrates. The coupling agent laminates the first and second substrates together and adheres the seal thereto. An external portion of the seal deflects against the edge of the opening in a direction of the first substrate.

According to still another aspect of the present disclosure, a seal deflects toward a first substrate. The first substrate is an exterior-facing substrate of a laminate window relative to an interior of a vehicle.

According to yet another aspect of the present disclosure, an edge of an opening has a lip that extends into the opening. A laminate window is disposed within the opening on the lip.

According to another aspect of the present disclosure, a vehicle window includes a first substrate substantially transparent to visible light and a second substrate disposed adjacent to the first substrate. A seal that has an internal portion is disposed between the first and second substrates. The seal also has an external portion that is disposed external to the first and second substrates. The external portion has a substantially flexible construction and substantially extends outward from the first and second substrates. A coupling agent is disposed between the first and second substrates. The coupling agent laminates the first and second substrates together. The external portion of the seal deflects against an edge of an opening in a direction of the first substrate.

According to another aspect of the present disclosure, at least one appendage wraps around an edge of a respective first or second substrate and extends onto an outer surface thereof.

According to still another aspect of the present disclosure, a vehicle window includes a variably transmissive electro-optic element disposed between first and second substrates.

According to another aspect of the present disclosure, a vehicle window includes a solar film disposed between first and second substrates.

According to still another aspect of the present disclosure, an internal portion has at least one mechanical interlock.

According to yet another aspect of the present disclosure, at least one mechanical interlock includes a void that defines a cavity portion that extends to an inboard edge of a first substrate.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle window assembly, comprising:
   a first substrate substantially transparent to visible light;
   a second substrate substantially transparent to visible light, the second substrate disposed in a spaced apart relationship relative to the first substrate, defining a space therebetween;
   a seal having an internal portion and an external portion, wherein:
      the internal portion is disposed in the space between the first and second substrates along at least part of peripheries thereof,
      the external portion is disposed external relative to space between the first and second substrates, the external portion having a substantially flexible construction and substantially extending outward from the first and second substrates, wherein the external portion of the seal has an appendage extending therefrom, the appendage substantially circumscribing the first substrate, and
      the seal substantially inhibits at least one of water and oxygen exterior the space from entering the space; and
   a coupling agent disposed between the first and second substrates, the coupling agent laminating the first and second substrates together and adhering the seal thereto, wherein when said vehicle window assembly is disposed in a window opening, the external portion of the seal deflects against an edge of the opening.

2. The vehicle window assembly of claim 1, further comprising:
   a solar film disposed between the first and second substrates.

3. The vehicle window assembly of claim 1, further comprising:
   a variably transmissive electro-optic element disposed between the first and second substrates.

4. The vehicle window assembly of claim 1, wherein when the seal deflects against the edge of the opening, and wherein a tip of the appendage contacts an edge of the first substrate.

5. The vehicle window assembly of claim 1, wherein the appendage is a ridge extending from the external portion of the seal.

6. The vehicle window assembly of claim 1, wherein the appendage substantially covers and abuts an edge of one of the first substrate and the second substrate.

7. The vehicle window assembly of claim 6, wherein the at least one appendage wraps around the edge of the respective substrate and extends onto an outer surface thereof.

8. The vehicle window assembly of claim 6, wherein a thickness of the window assembly from the edges of the first and second substrates to an internal edge of the seal has a variance of less than 5%, the thickness measured as a distance between outer surfaces of the first and second substrates.

9. The vehicle window assembly of claim 3, further comprising:

an electrically conductive connector connected to the electro-optic element and extending to a terminus exterior the space, wherein the connector extends between the seal and one of the first and second substrates.

10. An optic system for a vehicle, the system comprising:

a window opening defined by said vehicle, at least in part, by an edge thereof;

a laminate window disposed in the opening, the laminate window comprising:

a first substrate substantially transparent to visible light;

a second substrate substantially transparent to visible light, the second substrate disposed in a spaced apart relationship relative to the first substrate, and defining a space therebetween;

a seal having an internal portion and an external portion, wherein:

the internal portion is disposed in the space between the first and second substrates along at least part of peripheries thereof, the external portion is disposed external relative to space between the first and second substrates, the external portion having a substantially flexible construction and substantially extending outward from the first and second substrates, and the seal substantially inhibits at least one of water and oxygen exterior the space from entering the space; and a coupling agent disposed between the first and second substrates, the coupling agent laminating the first and second substrates together and adhering the seal thereto, wherein an external portion of the seal deflects against the edge of the opening in a direction of the first substrate.

11. The system of claim 10, wherein the seal deflects toward the first substrate, the first substrate being an exterior facing substrate of the laminate window relative to an interior of said vehicle.

12. The system of claim 11, wherein the edge of the opening has a lip extending into the opening, and wherein the laminate window is disposed within the opening on the lip.

13. A vehicle window comprising:

a first substrate substantially transparent to visible light;

a second substrate disposed adjacent to the first substrate;

a seal having an internal portion disposed between the first and second substrates and an external portion disposed external to the first and second substrates, the external portion having a substantially flexible construction and substantially extending outward from the first and second substrates, wherein the external portion has at least one appendage substantially covering and abutting an edge of one of the first substrate and an edge of the second substrate; and a coupling agent disposed between the first and second substrates, the coupling agent laminating the first and second substrates together, wherein the external portion of the seal deflects against an edge of an opening in a direction of the first substrate.

14. The vehicle window of claim 13, wherein the at least one appendage wraps around the edge of the respective first or second substrate and extends onto an outer surface thereof.

15. The vehicle window of claim 13, further comprising:

a variably transmissive electro-optic element disposed between the first and second substrates.

16. The vehicle window of claim 13, further comprising:

a solar film disposed between the first and second substrates.

17. The vehicle window of claim 13, wherein the internal portion has at least one mechanical interlock.

18. The vehicle window of claim 17, wherein the at least one mechanical interlock includes a void defining a cavity portion that extends to an inboard edge of the first substrate.

\* \* \* \* \*